United States Patent [19]
Lundquist

[11] Patent Number: 5,277,801
[45] Date of Patent: Jan. 11, 1994

[54] SKIMMING DEVICE FOR SWIMMING POOLS

[76] Inventor: Philip Lundquist, 3715 Liberty Ave., North Bergen, N.J. 07047

[21] Appl. No.: 999,691

[22] Filed: Dec. 28, 1992

[51] Int. Cl.⁵ .................. B01D 35/027; E04H 4/00
[52] U.S. Cl. .................................... 210/169; 4/490
[58] Field of Search .......... 210/169, 416.2; 15/1.7; 4/490

[56] References Cited

U.S. PATENT DOCUMENTS

| | | | |
|---|---|---|---|
| 3,625,364 | 12/1971 | La Chance | 210/169 |
| 3,840,118 | 10/1974 | Whitmore | 210/169 |
| 4,068,327 | 1/1978 | Heinlein | 210/169 |
| 4,140,634 | 2/1979 | Harry | 15/1.7 |
| 4,369,109 | 1/1983 | Edge | 210/238 |
| 4,557,001 | 12/1985 | Burkhart | 4/490 |
| 4,889,622 | 12/1989 | Newcombe-Bond | 210/169 |
| 5,043,060 | 8/1991 | Brennan | 15/1.7 |
| 5,173,181 | 12/1992 | McFarland | 210/169 |

FOREIGN PATENT DOCUMENTS 590252 1/1960 Canada .

Primary Examiner—Stanley S. Silverman
Assistant Examiner—Robert James Popovics
Attorney, Agent, or Firm—Donald R. Heiner

[57] ABSTRACT

The invention relates to a device used in conjunction with a swimming pool, especially an aboveground pool for skimming debris floating on the surface of the water, catching the debris in a pocket formed in a net made of a mesh material, and then removing the debris from the pool. A pole is detachably mounted to the side of the pool, and extends inwardly toward the center of the pool. The mesh net is disposed over the pole and depends downwardly below the surface of the water. The end of the net distant from the pole receives a rod which weighs the net down and keeps it below the water level. The lower portion of the net is then folded upward to some distance below the water level and the two vertical edges of the net are then sealed together thereby forming a pocket for catching the debris.

8 Claims, 2 Drawing Sheets

SKIMMING DEVICE FOR SWIMMING POOLS

BACKGROUND OF INVENTION

1. Field of the Invention

The present invention generally involves the field of technology pertaining to a device for skimming debris from the surface of the water in a swimming pool; especially an above ground, backyard swimming pool, employing the use of a pump and filter for circulating and cleaning the water.

In general, the device comprises a net made of a suitable mesh material which is disposed, at one end, around a pole which is detachably mounted to the side of a pool and which extends inwardly toward the center of the pool when it is mounted on the pool wall. The net extends downwardly from the pole and into the water. The lower end of the net, distant from the pole, has a rod attached to it for weighing the net downward below the water surface. The lower end of the net is then folded upward some distance below the water surface and the two edges of the net are then sealed together by any suitable means thereby forming a pocket in the net for catching the debris as it impacts on the net. The water in the pool is circulated by means of a standard pump and filter system.

The net can be easily cleaned by removing it from the pool and hosing it down or in any other manner.

2. Description of the Prior Art

A search of the prior art has uncovered the Heinlien U.S. Pat. No. 4,068,327; Burkhart U.S. Pat. No. 4,557,001; Newcombe-Bond U.S. Pat. No. 4,889,622; LaChance U.S. Pat. No. 3,625,364; and Canadian Patent 590,252.

There is a substantial structural difference between the screening 24 in the LaChance patent and the net with a pocket disclosed in the instant invention.

The Heinlein U.S. Pat. No. 4,068,327 teaches a skimmer bar, projecting generally obliquely toward the direction from which normal circulation of water in the pool takes place, defining with the adjacent pool side a pocket for receiving and directing debris. Thus, the debris is not caught in a net.

In the Newcombe-Bond U.S. Pat. No. 4,889,622, a mesh bag is slipped over floats to hang behind them and to catch and retain floating debris which enters the float. This is substantially different from the net with a pocket of the instant invention.

The Burkhart U S. Pat. No. 4,557,001, depends upon movement of the ends of a skirt member relative to each other to form a loop which traps the debris. The skirt, now in the form of a loop, is then removed from the water.

Canadian Patent 590,252 has a water filtering means in the form of a bag secured around a casing wherein a turbine driven propeller is provided to circulate the water which discharges into the bag.

SUMMARY OF THE INVENTION

According to the present invention a net or screen of fine mesh material is looped around a pole at one end such that the net can be removed from the pole by simply sliding the pole relative to the net. The other end of the net is looped or wrapped around a rod which acts to weigh the net downwardly into and below the surface of water in a swimming pool; especially an above ground, backyard swimming pool. The end of the net containing the rod is then folded upward some distance toward the end containing the pole and the two edges of the net are then sealed together by any well known means such as sewing, tape, velcro, etc. Thereby forming a pocket for catching and holding debris floating on the surface of the water.

One end of the pole is attached by any well known means, such as a mounting bracket, to the side of the pool and the other end extends inwardly toward the center of the pool. The net, weighed down by the rod, depends vertically downwardly into the water with the pocket below the water surface level.

The water in the pool is circulated by means of a conventional pump and filter system operatively associated with the pool. The circulating water impacts on the net and any debris floating in the water will be caused to fall into and be held in the pocket of the net.

When it is desired to clean the net the pole and net are removed from the mounting bracket and the net can be hosed down from the reverse side or the pocket emptied by any other convenient means. The pole and net can then be re-attached to the pool at any convenient time for further skimming.

It is therefore an object of the present invention to provide a skimming device for use with a swimming pool.

It is another object of the invention to provide a skimming device for swimming pools wherein a net is detachably mounted to a pole which in turn is detachably mounted to the side of the pool.

It is a further object of the invention to provide a skimming device for swimming pools wherein a net is detachably mounted to a pole which in turn is detachably mounted to the side of a pool and wherein a pocket is formed in the net for catching and holding debris floating on the water of the pool when the water is circulating by means of a conventional pump and filter system.

These and other objects, features and advantages of the invention shall become apparent from the following detailed description of a preferred embodiment thereof when taken in conjunction with the drawings wherein like reference characters refer to corresponding parts in the several views.

DETAILED DESCRIPTION OF THE PREFERRED EMBODIMENT

Figure 1:
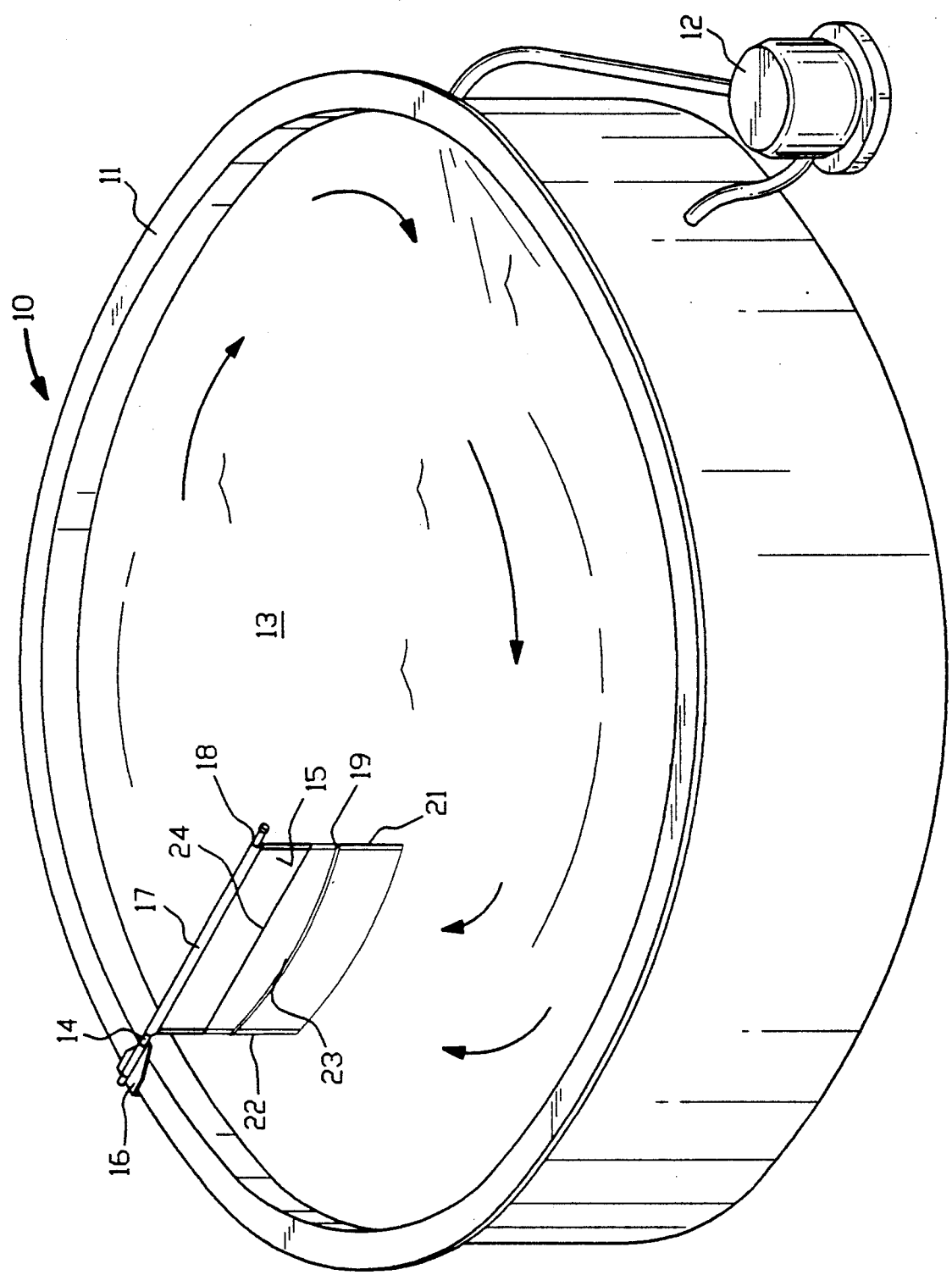
FIG. 1 is a perspective view of an above ground swimming pool showing the net, pole, and mounting bracket of the instant invention in place.

A skimming device for cleaning debris floating on the surface of water circulating in a swimming pool according to a preferred embodiment of the invention will now be described with reference to FIGS. 1-3 of the drawings.

An above ground swimming pool 10 is shown having a wall 11 and a pump and filter means generally shown at 12 for circulating water 13 in the pool when the pump is turned on. It is to be understood that the pool does not have to be of the above ground type and that the pump and filter system are shown for illustrative purposes only and that any means for circulating the water in the pool may be provided.

A pole 14 for supporting a net 15 is shown detachably mounted to the wall 11 by means of a mounting bracket such as shown at 16. The pole 14, when mounted to the wall 11, extends inwardly toward the center of the pool and is generally perpendicular to the surface of the water. End 17 of net 15 is secured to the pole 14 by any suitable means such as by forming a loop in the net over the pole 14 as shown at 18.

The net 15 is made of a mesh material and depends vertically downwardly from the pole 14 into the water 13 circulating in pool 10.

Figure 3:
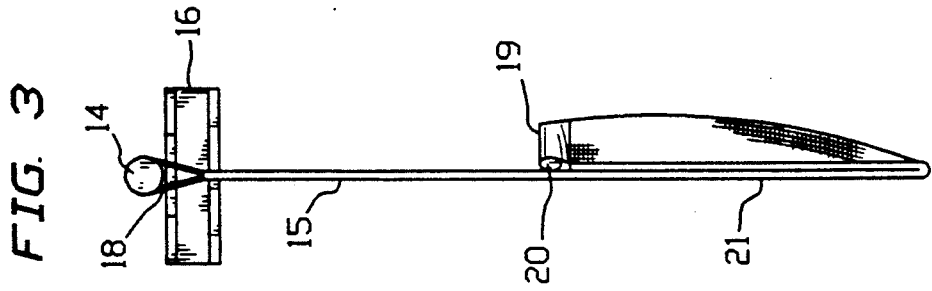
FIG. 3 is an end view of the net, pole and bracket of FIG. 2 looking into the left end.
Figure 2:
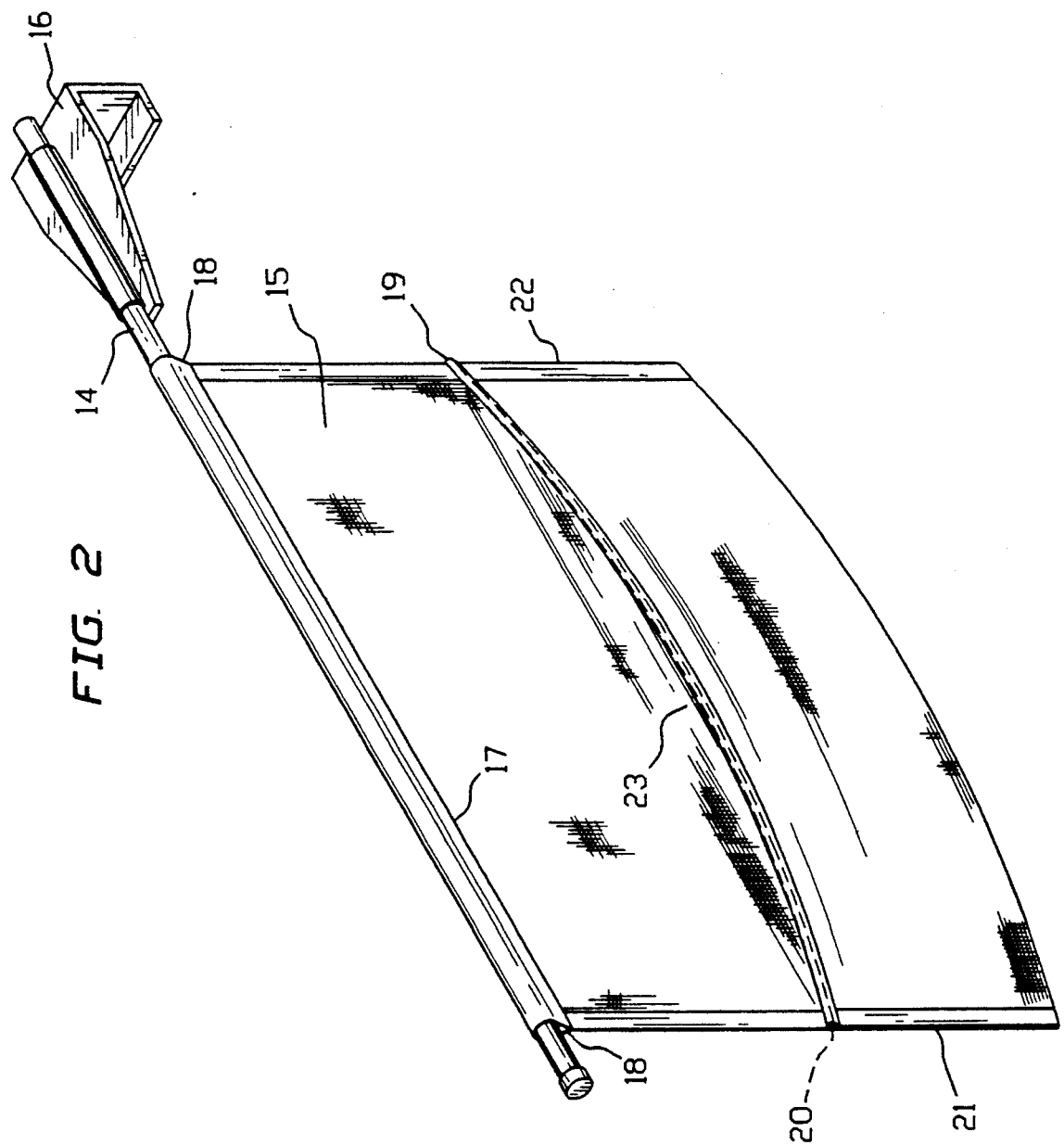
FIG. 2 is a perspective view of the net, pole, and bracket of the instant invention out of the pool and showing the debris catching pocket.

The lower end 19 of net 15 distant from pole 14, has a metal rod 20 attached to it by any convenient and well known means such as by looping end 19 over the rod as clearly shown in FIGS. 2 and 3. This metal rod assists in weighing the net downwardly and keeping it in a generally vertical orientation when it is in the water.

The end 19 of net 15 is then folded upwardly some distance toward the pole end of the net as clearly seen in FIGS. 2 and 3 and the two vertical edges 21 and 22 of net 15 are then sealed together to form the debris catching pocket 23. Any well known means such as sewing, tape, velcro, etc. can be used to seal the edges 21 and 22. The water level, above the pocket, is shown at 24.

In operation, the net is slid over the pole by means of the loop formed on the upper end of the net and the pole is attached to the bracket mounted on the pool wall. The net will depend downwardly into the water; weighed down by the rod attached to the other end of the net, and the pocket will be submerged below the water level. The water is circulated by means of the pump-filter system and will impact on the net. Any debris floating on the water and impacting on the net will be caught and held in the pocket. The net and pole can then be removed from the water and mounting bracket and cleaned.

Though the invention has been described and illustrated with reference to a preferred embodiment thereof, those skilled in the art will appreciate that various changes and modifications in shape, size, composition and arrangement of parts may be resorted to without departing from the spirit of the invention or scope of the subjoined claims.

What is claimed is:

1. A skimming device for catching and removing debris from water in a swimming pool having a wall and means for circulating the water in said pool wherein said skimming device comprises:
    (a) A pole detachably mounted to said wall of said pool and extending inwardly toward the center of said pool;
    (b) A net depending downwardly from said pole and into the water;
    (c) means attached to one end of said net distant from said pole for weighing said net downwardly below the surface of said water; and
    (d) means for sealing two edges of said net together to form a pocket for catching said debris after the end of said net distant from said pole is folded upward to some distance below the water surface whereby when said water is circulating said debris is caused to impact with said net and fall into said pocket.

2. The device of claim 1 wherein said pole is detachably mounted to said wall of said pool by a mounting bracket attached to said wall of said pool.

3. The device of claim 2 wherein said net is made of a mesh material.

4. The device of claim 3 wherein one end of said net is removably wrapped around said pole.

5. The device of claim 4 wherein said means attached to one end of said net distant from said pole for weighing said net downwardly below the surface of said water is a metal rod.

6. The device of claim 5 wherein said means for sealing the two edges of said net together to form a pocket is sewing.

7. The device of claim 5 wherein said means for sealing the two edges of said net together to form a pocket is tape.

8. The device of claim 5 wherein said means for circulating the water in said pool is a pump and filter system.

* * * * *